United States Patent [19]
Sakata

[11] Patent Number: 5,341,492
[45] Date of Patent: Aug. 23, 1994

[54] FRAME CONVERSION CIRCUIT INCLUDING INITIAL VALUE INPUT CIRCUIT

[75] Inventor: Tatsumi Sakata, Fukuoka, Japan

[73] Assignee: Fujitsu Limited, Kawasaki, Japan

[21] Appl. No.: 155,159

[22] Filed: Nov. 19, 1993

Related U.S. Application Data

[63] Continuation of Ser. No. 542,098, Jun. 22, 1990, abandoned.

[30] Foreign Application Priority Data

Jun. 29, 1989 [JP] Japan ................................ 1-167840

[51] Int. Cl.$^5$ .................. G06F 13/00; G06F 5/06; H04J 3/06; G11C 7/00
[52] U.S. Cl. ........................ 395/425; 395/250; 370/82; 370/85.1; 370/102; 365/95
[58] Field of Search ................ 395/425, 250, 700; 371/72; 370/82, 85.1, 102; 365/95

[56] References Cited

U.S. PATENT DOCUMENTS 4,186,379  1/1980  Knoblock et al. .................. 371/72
4,873,684 10/1989  Kobayashi et al. ............... 370/102

FOREIGN PATENT DOCUMENTS

0234937A2  2/1987  European Pat. Off. .
0071530    8/1979  Japan .
2094524A   3/1982  United Kingdom .

*Primary Examiner*—Glenn Gossage
*Attorney, Agent, or Firm*—Staas & Halsey

[57] ABSTRACT

A frame conversion circuit for changing data with different speeds to the same speed to thereby obtain data of the same frame length is provided with an initial value inputting circuit for writing an arbitrary initial value into a memory at each address each time data is sequentially read out according to a read address signal from the memory. Therefore, no error is produced in a sign bit check and the possibility of occurrence of erroneous synchronization is minimized. The initial value inputting circuit may be implemented using a plurality of pull-up resistors connected to a data bus.

5 Claims, 7 Drawing Sheets

FRAME CONVERSION CIRCUIT INCLUDING INITIAL VALUE INPUT CIRCUIT

This application is a continuation of U.S. application Ser. No. 07/542,098, filed Jun. 22, 1990, now abandoned.

BACKGROUND OF THE INVENTION

The present invention relates to a frame conversion circuit for demultiplexing various incoming multiplexed signals that have been transmitted over a high-speed communication line and then converting the demultiplexed signals into the same frames thereby making the speeds of the various data signals uniform.

In digital transmission systems, in general, several pieces of information are transmitted after being multiplexed in order to achieve effective use of the transmission medium and greater economy in the transmission. Such multiplexing is performed based on time. One period of the multiplexed signal is called a frame and the multiplexing method is called time-division multiplexing. A plurality of low order group digital signals are time-divisionally multiplexed by a multiplexer into high order group digital signals before transmission over the high-speed communication line. Thus, a greater number of channels are transmitted over the same link. These signals are transmitted from one exchange to another by a suitable transmission means capable of accommodating the necessary number of channels, and thereby transmitted to a destination. Upon arrival at the destination, the high order group digital signals are separated into low order group digital signals by a demultiplexer.

Specifically, in a system like the Integrated Services Digital Network (ISDN), various data such as general data, speech signals, and video signals are transmitted after being multiplexed at different speeds. Therefore, a process for demultiplexing these multiplexed signals with different speeds is required. Hence, a frame conversion circuit adds redundant bits to the lower speed signals, thereby providing them with the same speed as the higher speed signals.

Figure 1:
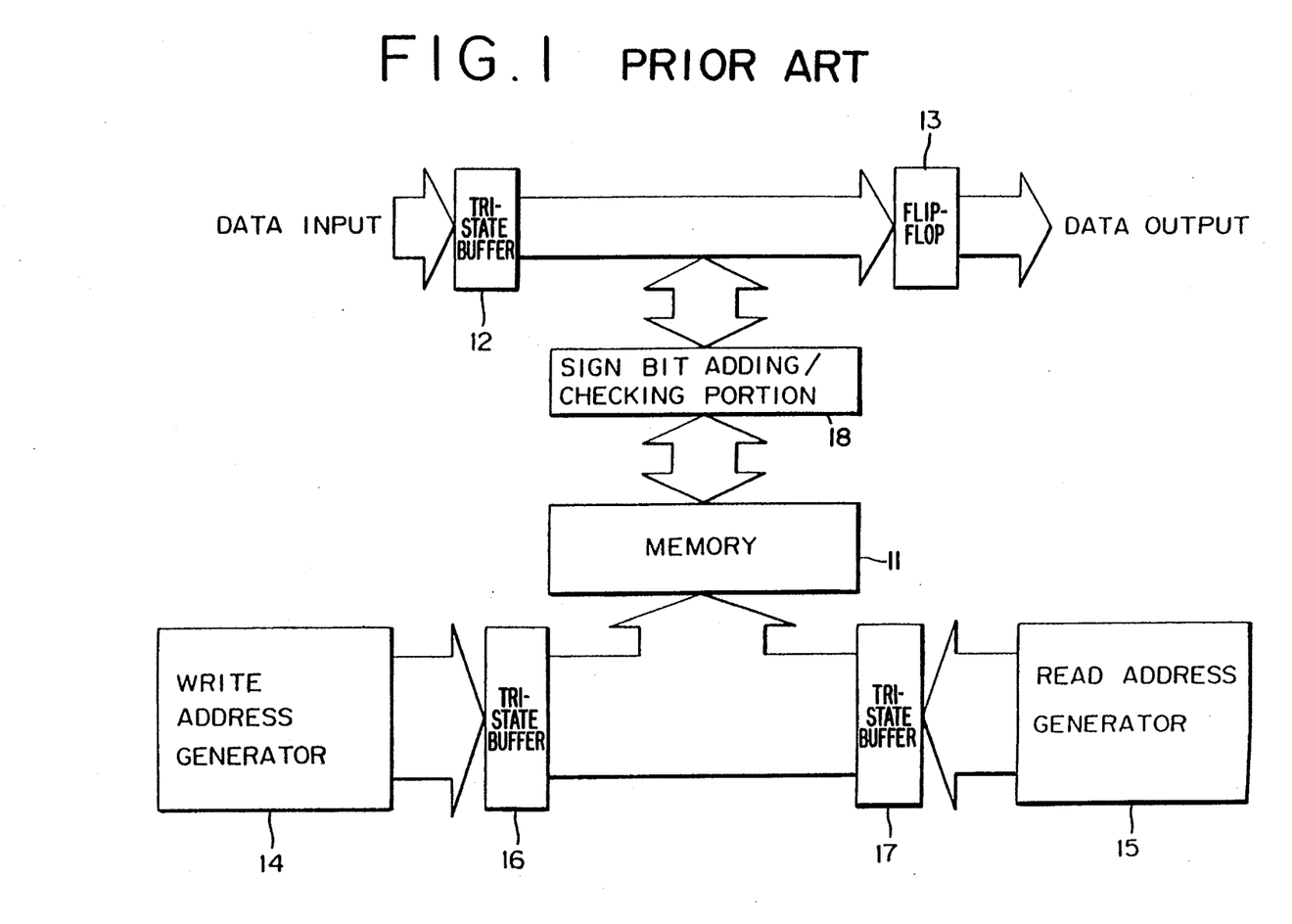
FIG. 1 is a block diagram showing a general structure of a prior art frame conversion circuit.
Figure 2:
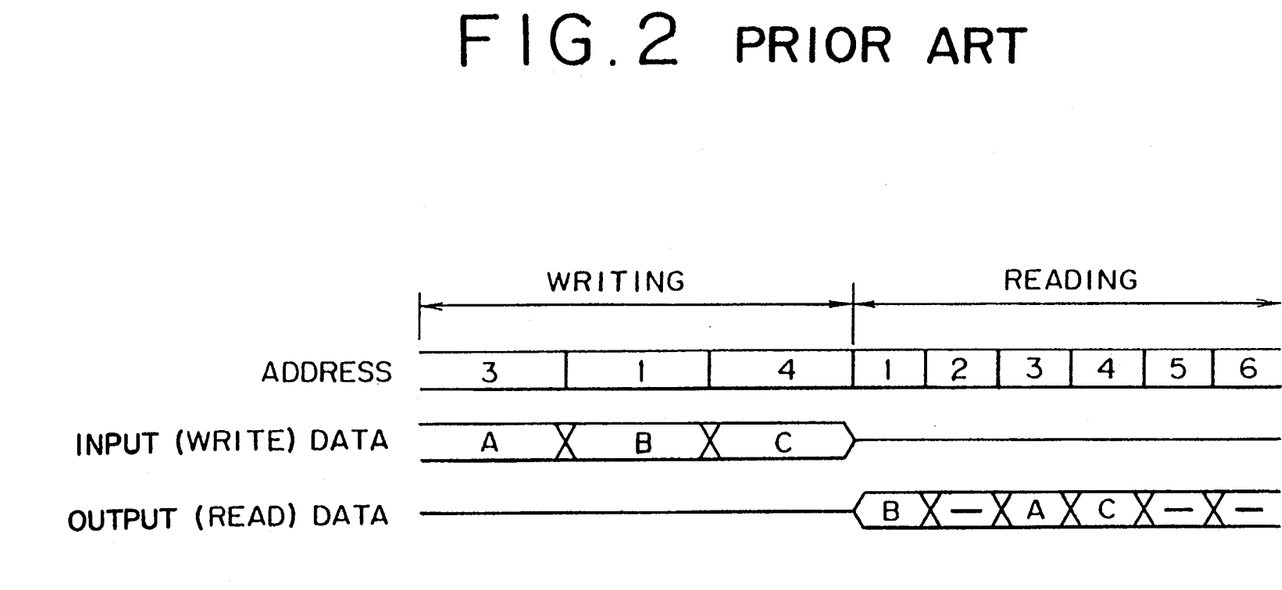
FIG. 2 is a time chart associated with the operation of the frame conversion circuit of FIG. 1.

A representative example of prior art frame conversion circuits will be described below with reference to FIG. 1 and FIG. 2. When data (A, B, and C in FIG. 2) are input from a high speed communication line to a tristate buffer 12, the tristate buffer 12 and a tristate buffer 16 are enabled and simultaneously, address signals, generated in a random pattern (3, 1, and 4 in FIG. 2) for indicating addresses at which the data should be written into a memory 11, are output from a write address generator 14. The data are written into the memory according to these address signals. At this time, each random address signal corresponds to a kind of data. Upon completion of the writing of the data into the memory, a tristate buffer 17 is enabled and, at the same time, sequential address signals (1, 2, 3, 4, 5, 6 in FIG. 2) are output from a read address generator 15, and thereupon, data (B, -, A, C, -, - in FIG. 2) are read out from the memory according to these address signals. Here, "-" represents a frame stored in the memory previously or an indefinite frame.

A sign bit adding/checking portion 18 includes a cyclic redundancy check. It adds sign bits to the rearmost position of the data written in the memory, and at the time it monitors the sign bits thereby checking whether the data is properly transmitted and received. By repeating such random writing of data into the memory according to the kinds of data, sequentially addressing the addresses in memory and reading the data from the memory, the frame conversion for arranging various data of different speeds into high speed signals having a uniform speed is performed.

Figure 3:
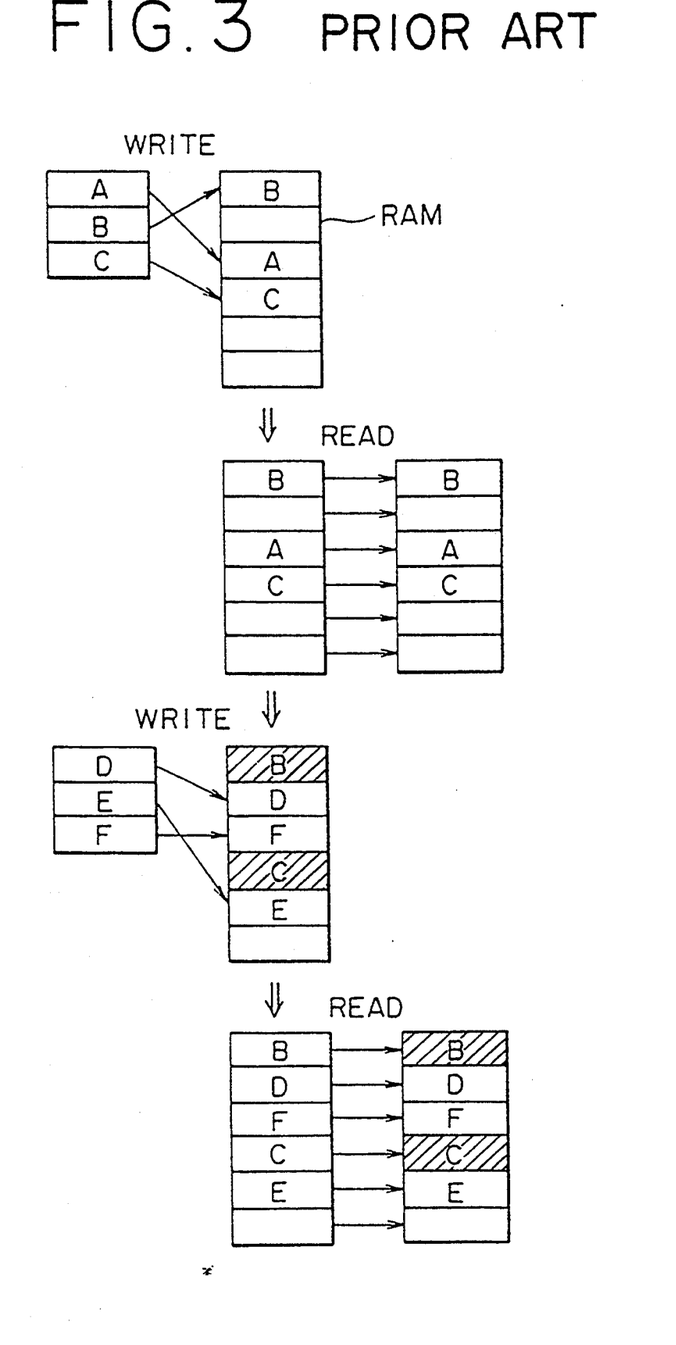
FIG. 3 and FIG. 4 are explanatory drawings for explaining problems in the prior art frame conversion circuit.

In the above-described conventional frame conversion circuit, when data was written into the memory according to random address signals and, then, sequentially read out, there remained data that had previously been written at the addresses where data was not written this time. Hence, the previous data will also be read out as indicated by oblique lines in FIG. 3. When the read out data are processed in such case, it sometimes occurs that the system becomes unable to recognize the position where the currently processed data is located. In such an event, confirmation of the data is achieved by synchronizing the data by means of the synchronization bits within the frames. But, if old data has remained and the data are by some chance taken as the synchronization bits, then erroneous synchronization or malfunction occurs, which has been a problem in the prior art.

Figure 4:
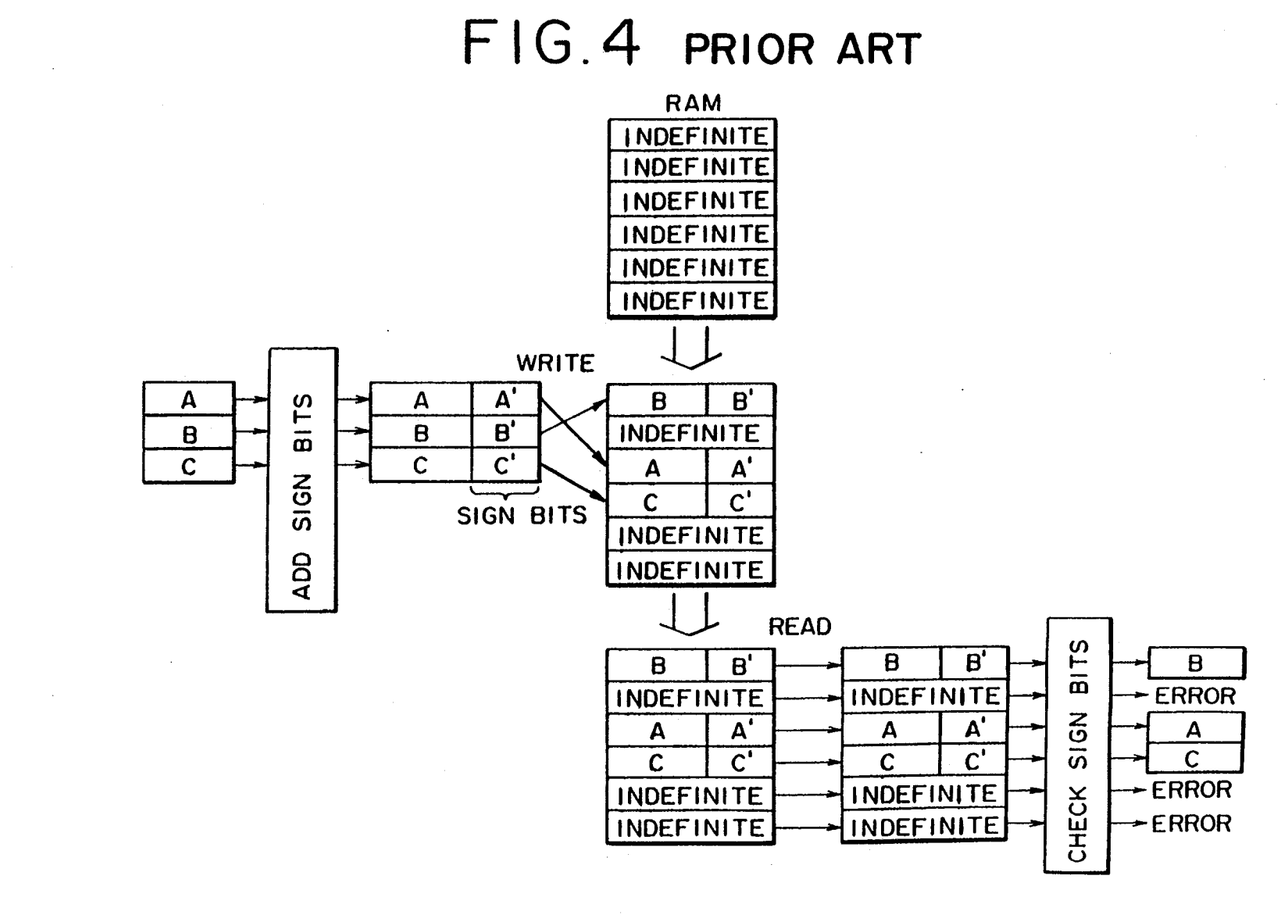

Further, when data are read out from the memory in the initial stage, if there is any address in the memory at which no data was input earlier, the indefinite data read out from the region at that address will be without any sign bits attached thereto, and therefore, errors will be produced when the sign bit is checked as shown in FIG. 4, which has also been a problem in the prior art.

SUMMARY OF THE INVENTION

Accordingly, an object of the present invention is to provide a frame conversion circuit in which no error will be produced during the sign bit check step.

Another object of the present invention is to provide a highly reliable frame conversion circuit in which data, which would cause erroneous synchronization, will not be included in the read out data.

In accordance with an aspect of the present invention, there is provided a frame conversion circuit including: write address generation means for generating a random address signal and for writing an incoming transmitted data signal into a memory; means for adding sign bits to the data to be written into the memory and for checking the sign bits at the time when the data is read out from the memory; read address generation means for generating sequential address signals for addressing addresses in the memory sequentially based on the sequential address signals, and for reading the data from each address in the memory; and initial value input means for writing an arbitrary initial value into the memory at each address each time the data is read out of the memory sequentially according to the read address signal.

Preferably, the initial value input means is formed of plural pull-up resistors connected in parallel with plural output lines of a tristate buffer to which the transmitted signal is input.

The above and other objects, features and advantages of the present invention and the manner of realizing them will become more apparent, and the invention itself will best be understood, from a study of the following description and appended claims, with reference to the attached drawings showing some preferred embodiments of the invention.

DESCRIPTION OF THE PREFERRED EMBODIMENTS

Figure 5:
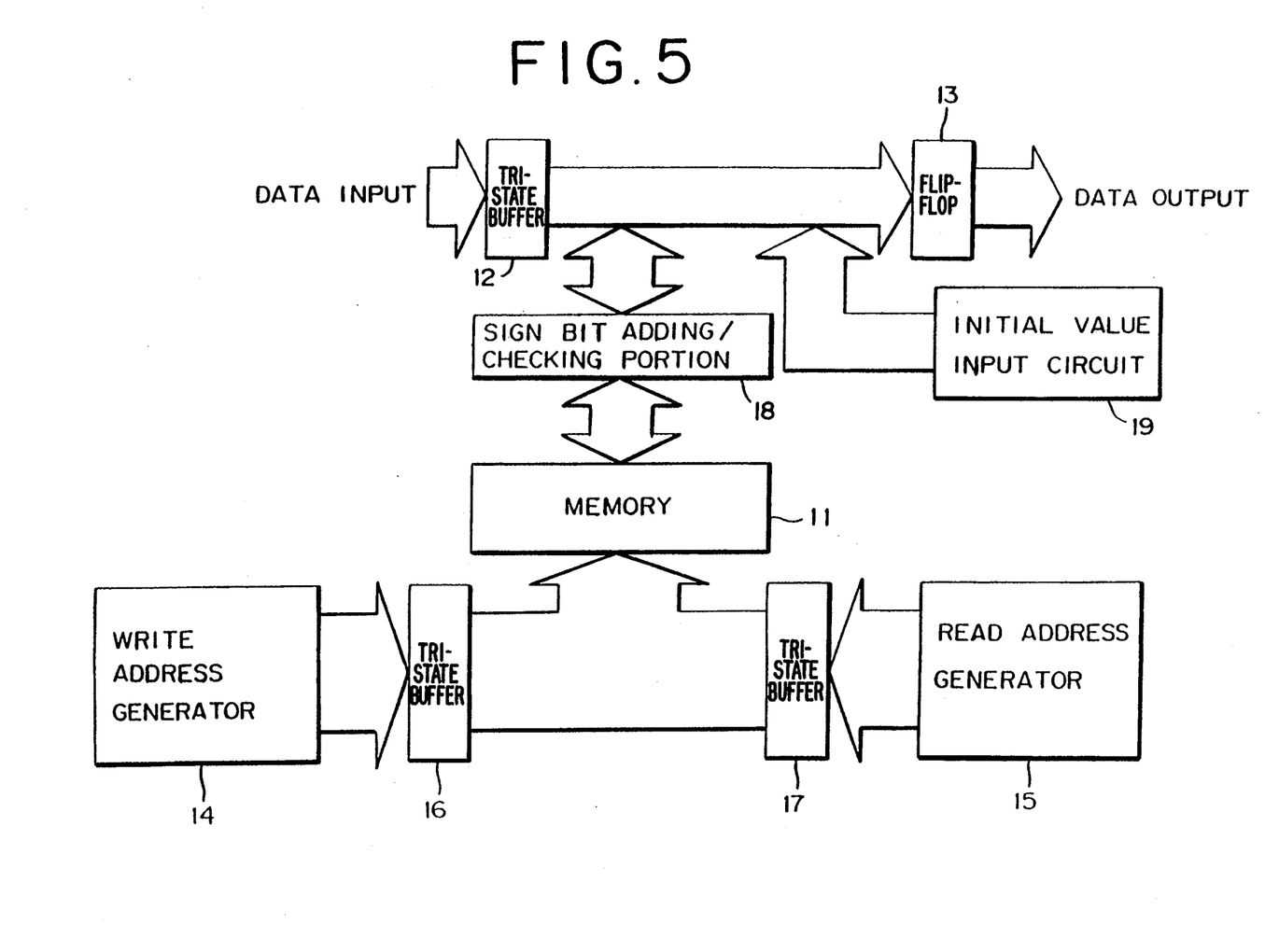
FIG. 5 is a block diagram showing an embodiment of the present invention.

First, the principle of the frame conversion circuit of the present invention will be briefly described below with reference to FIG. 5. In the block diagram of FIG. 5, parts similar to or corresponding to those in the prior art frame conversion circuit shown in FIG. 1 are denoted by the same reference numerals and explanation of the same is omitted here. As is apparent by comparing FIG. 5 with FIG. 1, the frame conversion circuit of the present invention differs from the prior art frame conversion circuit only in that it is provided with an initial value inputting circuit 19. Addresses in the memory are sequentially addressed and each time data is read out from each address of the memory according to a read address signal. The initial value inputting circuit 19 writes an arbitrary initial value into the memory at the address from which the data is read out. The initial value is preferably "all 1s" or "all 0s". Since, such an initial value is written, each time data is read out, into the memory at the address from which the data is read out, an error does not occur during a sign bit check and erroneous synchronization is also prevented from occurring.

Figure 6:
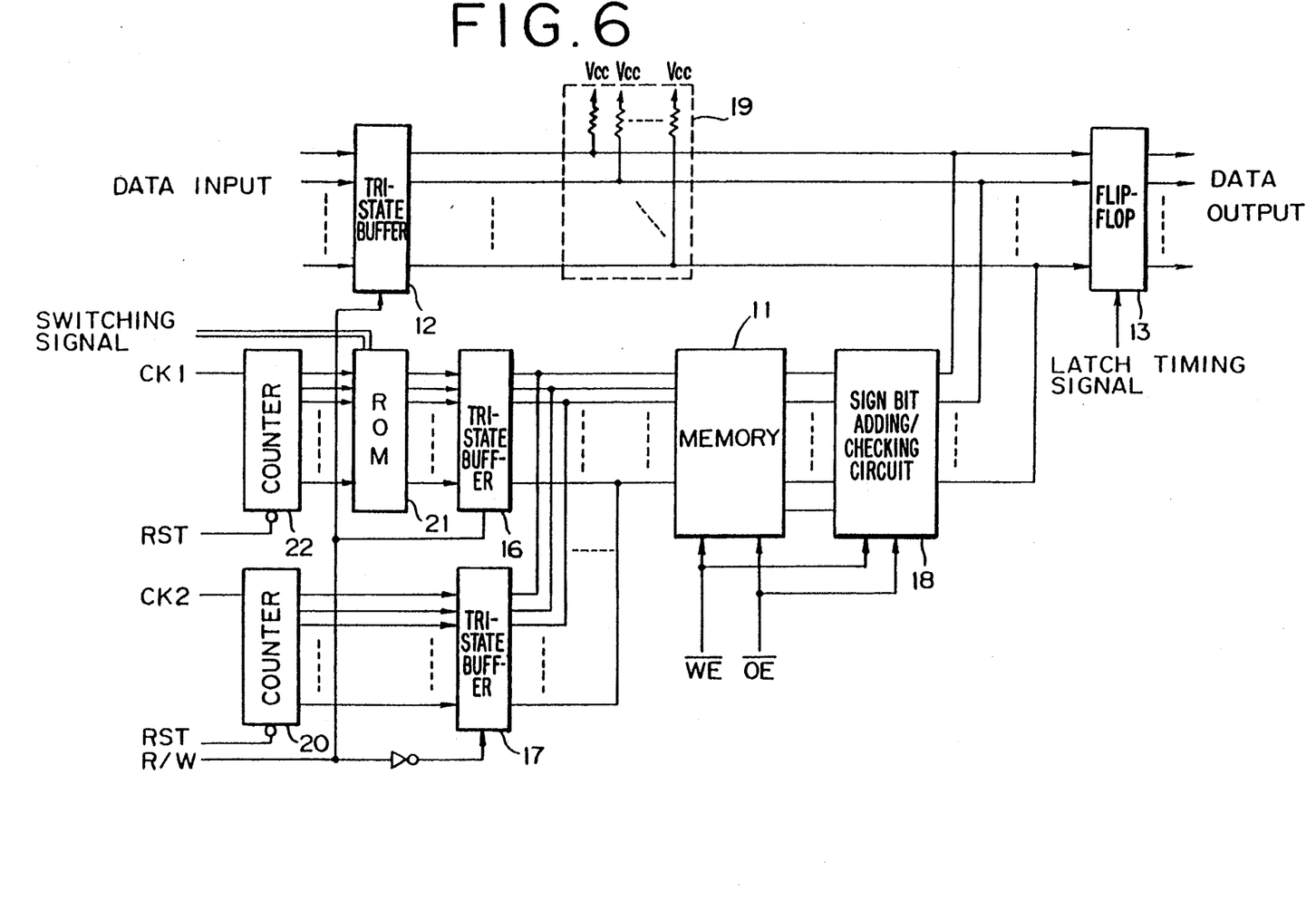
FIG. 6 is a block diagram showing an embodiment of the present invention.

Referring now to FIG. 6, an embodiment of the frame conversion circuit of the present invention will be described below. The frame conversion circuit of the present embodiment is, for example, a 24-multiframe structure in an octet multiplexing method with one frame having a length of an octet and, hence, there are eight output lines of the tristate buffer 12. The write address generator 14 in FIG. 5 is a counter 22 and a ROM 21 and the read address generator 15 is a counter 20. In the ROM 21, there are stored write addresses corresponding to the kinds of data such as general data and speech data to be written into the memory 11, and the random patterns of the address signals generated therefrom are changed by a switching signal generated by a controller, not shown, according to the kinds of data to be written into the memory 11. For example, when the data is general data, the address signals are output in the random pattern of 3, 2, 6 in binary numbers to the addresses designated by the binary numbers, whereas, in the case of speech data, the address signals are output in the random pattern of 4, 1, 6 to the addresses designated by the binary numbers. More specifically, the address signals output from the ROM 21 become different random patterns depending on the kind of data even when the signal from the counter is the same. For example, when the output of the counter 22 is 1, the address signal is 3 if the switching signal indicates that the data written into the memory 11 is general data, whereas it is 4 if the switching signal indicates that data is speech data. The read counter 20 outputs the count value in a binary number to the memory 11. The counter 22 is reset each time data is read out from the memory 11, while the counter 20 is reset each time data is written into the memory 11. The tristate buffers 12, 16, and 17 are controlled by control signals (R/W signals) from the controller, not shown, so that they area brought into an enabled state or a disabled state.

Figure 7:
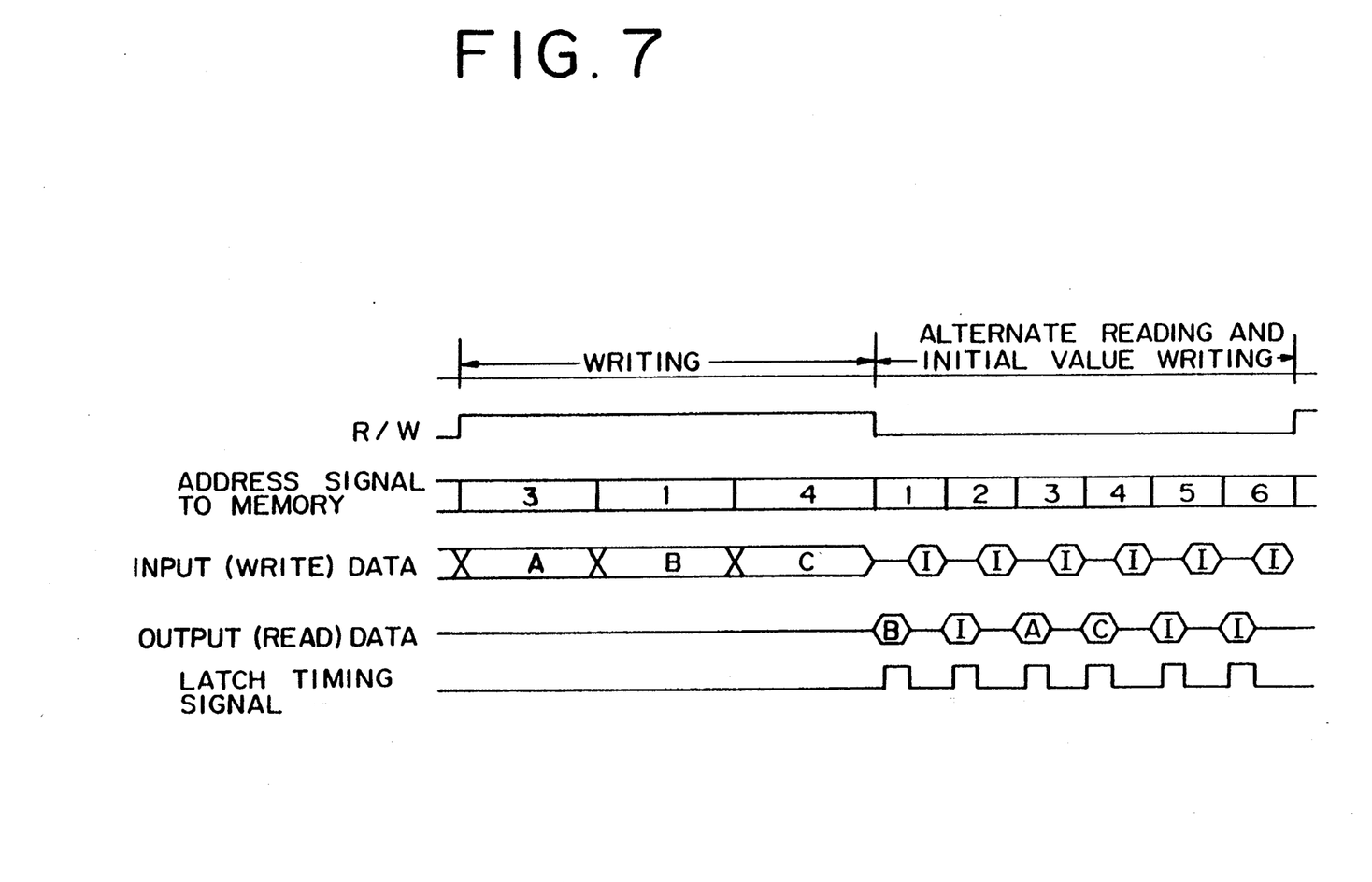
FIG. 7 is a time chart associated with the embodiment shown in FIG. 6.

Below will be described the operation of the present embodiment with reference to the time chart of FIG. 7. When speech data A, B, and C are input to the tristate buffer 12, the count value of the counter 22 is input to the ROM 21 and, at the same time, a switching signal is input to the ROM 21, whereby address signals for speech data are generated by the ROM 21. Upon the control signal (R/W signal) going High to tristate buffer 12, the tristate buffer 12 is brought into the enabled state. At the same time, the tristate buffer 16 is also brought into the enabled state. Then a sign bit is added to the input data output from the tristate buffer 12 by the sign bit adding/checking circuit 18 and the input data with the sign bit attached thereto are written into the memory 11 according to the address signals from the ROM 21 (3, 1, and 4 in FIG. 7) and a write enable signal. After the described operations are repeated several times, the data A, B, and C are written into the memory at the designated addresses.

Upon completion of the writing of data into the memory 11, the tristate buffer 17 is brought into the enabled state, and the count values of the counter 20 are output in binary numbers to the memory 11. Since these counted values become the read address signals (1, 2, 3, 4, 5, and 6 in FIG. 7), data are read out from the memory 11 sequentially according to these read address signals and an output enable signal. At this time, a sign bit check is simultaneously performed by the sign bit adding/checking circuit 18. The read out data are latched by the flip-flop circuit 13 according to a latch timing signal and, then, are output therefrom. The output lines of the tristate buffer 12 are held High by the initial value inputting circuit 19, each time a data reading operation is performed, so that a set of sign bits is added to the data by the sign bit adding/checking circuit 18 according to the address signal at the time of the reading, and data of "all 1s" is written into the memory 11 at each address. Accordingly, after all the data are read out from the memory 11, the memory is in an "all 1s+sign bit" state.

Therefore, there are no indefinite frames in the memory 11, but the pattern of "all 1s" which has a very low probability of causing erroneous synchronization or malfunction, is written into memory. Hence, reliability of the frame conversion circuit can be improved. Further, data is always written in the memory 11 at all of the addresses in memory, so that no error occurs during the sign bit check.

The initial value inputting circuit 19 includes pull-up resistors connected to the eight output lines of the tristate buffer 12. When the output of the tristate buffer 12 is in the high impedance state (R/W signal is low), the output lines are held High. Therefore, the initial values input by the initial value inputting circuit 19 in the present embodiment become "all 1s". When the tristate buffer 12 is in the enable state (R/W signal is High) and the output data signal is Low, then, even if the output lines are pulled up by the pull-up resistors of the initial value inputting circuit 19, the output lines go Low since the output lines are grounded through the ground within the tristate buffer 12. Thus, the input signal to the tristate buffer 12 is the output of the tristate buffer 12.

What is claimed is:

1. A frame conversion circuit comprising:

means for receiving a variety of types of data signals from a data bus, each data signal having data elements;

means for adding a sign bit to the data elements of the received data signals;

write address means for generating a random address signal, based on the type of data signal, and for writing the data elements of each data signal into memory locations, based on the random address signal;

read address generation for generating a sequential address signal to address the memory locations sequentially, for reading each data element from each memory location, based on the sequential address signal, and for checking the sign bit of each data element as each data element is read out; and initial value input means for writing an arbitrary initial value into each memory location as each data element corresponding to each memory location is read out.

2. The frame conversion circuit according to claim 1, wherein the initial value input means comprises a plurality of pull-up resistors, each connected to the data bus.

3. The frame conversion circuit according to claim 1, further comprising a flip-flop circuit, connected to the read means and the data bus, which, in response to a latch timing signal which indicates when the flip-flop circuit should latch data read out by the read means, outputs latched data to the data bus.

4. The frame conversion circuit according to claim 1, wherein the arbitrary initial value written into each memory location comprises plural bits of a common bit value and a sign bit.

5. The frame conversion circuit of claim 4, wherein the common bit value is "1".

* * * * *